May 25, 1937.  A. M. ROSSMAN  2,081,369

FREQUENCY CONVERTER

Filed April 22, 1935

INVENTOR:
ALLEN M. ROSSMAN

BY: C. T. Parker

ATTORNEY

Patented May 25, 1937

2,081,369

UNITED STATES PATENT OFFICE 2,081,369

FREQUENCY CONVERTER

Allen M. Rossman, Wilmette, Ill., assignor to Rossman Engineering Company, Chicago, Ill., a corporation of Illinois Application April 22, 1935, Serial No. 17,600

12 Claims. (Cl. 172—281)

This invention relates generally to frequency converters for transmitting power between two electrical systems of different frequencies, and more particularly to means for reducing the weight and cost of this type of equipment.

The most common type of frequency converter consists of a motor generator set comprising two direct connected synchronous machines, one of the machines being connected to each of the two systems. As both machines must run at the same speed of rotation, the speed of the set must obviously be a synchronous speed obtainable from an even number of poles on each machine when operated at its respective system frequency.

That is, as the speed of a synchronous machine is proportional to the frequency ($f$) and inversely proportional to the number of poles ($p$), the relation between the two machines is expressed by the following equation:

$$f_1/p_1 = f_2/p_2$$

where $p_1$ and $p_2$ must each of course be divisible by 2. For example, a frequency converter for tying a 60 cycle system with a 30 cycle system might be designed for 900 R. P. M., with 8 poles on the 60 cycle machine and 4 poles on the 30 cycle machine. There is obviously but little difficulty in interconnecting two systems of which one frequency is an even multiple of the other, as there are several desirable synchronous speeds which are common to both frequencies.

In this country, however, the great majority of systems operate at either 60 cycles or 25 cycles. Although 60 cycles is by far the most common, 25 cycle systems are still in general use in railway electrifications, steel mills, and in those parts of the country in which electrification was accomplished at a comparatively early date. Hence, the largest demand for frequency converters is for interconnecting 25 cycle systems with 60 cycle systems.

As the number of poles on the two machines in this case must be in the ratio of 60 to 25 or 2.4 to 1, the combination having the fewest even numbers of poles which will satisfy the above equation is 24 poles and 10 poles respectively, which unfortunately results in the comparatively low speed of 300 R. P. M.

It is a well known rule that the capacity of a given synchronous or induction machine is directly proportional to the lineal speed of the rotor element relative to the stator element. For a given speed of rotation, the lineal speed of a rotor is proportional to its diameter, but is limited by practical considerations of bracing the windings and anchoring the pole pieces against centrifugal force. In the case of salient pole synchronous machines the practical limit of peripheral speed is approximately 15,000 to 16,000 feet per minute, but to attain these speeds, a 300 R. P. M. machine must have a rotor diameter of 16 to 17 feet, which is much too large for mechanical reasons, except possibly on machines of very high capacities.

It is evident that in frequency converters of medium and small sizes, the core material is not used to greatest advantage, and therefore the sizes and weights of the machines are proportionally higher than in other applications of electrical machines where higher rotative speeds can be used.

The principal object of this invention relates to the provision of a frequency converter which is not restricted to a low speed of operation but in which the same ratio of frequencies may be obtained by lighter, higher speed machines than heretofore have been employed.

In this invention, recognition is taken of the fact that it is not the absolute speed of rotation of the rotor of a machine that determines the frequency but the relative rotative speed between the rotor member and the frame member, usually known as the stator. From this consideration it is contemplated that if the rotor member be operated in one direction of rotation, and the frame member be rotated in the opposite direction, the resultant speed which determines the frequency is equal to the sum of the absolute speeds of the two members.

Hence, instead of the machines of the frequency converter set being restricted to the same speed, the speed of one of the machines of the converter set becomes the resultant of two other speeds, thereby avoiding the inflexibility of the conventional single speed frequency converter, as there are several combinations of two 60 cycle synchronous speeds whose sum is equal to a 25 cycle synchronous speed and vice versa, the resultant speed in each case being considerably higher than 300 R. P. M., thereby appreciably increasing the capacity of a frequency converter set of a given weight of active materials.

In this case, the relation between the three machines of the converter is expressed by the following equation:

$$f_1/p_1 = f_2/p_2 + f_2/p_3$$

where $p_1$, $p_2$, and $p_3$ must each be divisible by 2.

Now, in order to acquaint those skilled in the art with the manner of constructing and operating my invention, I will describe embodiments and explain their operation with reference to the drawing which is appended to this specification, in which—

In the drawing and in the description which follows, like reference numerals indicate like parts.

Figure 1:
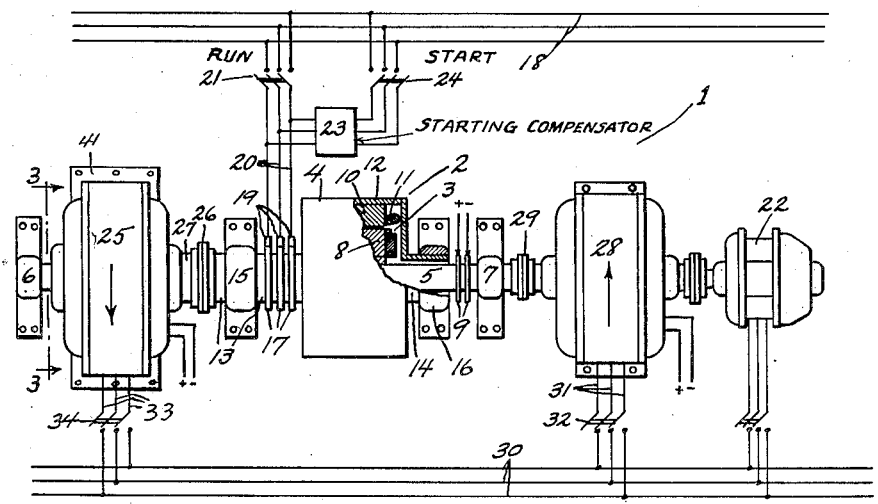
Figure 1 illustrates one embodiment of my invention in which the three principal machines are of the synchronous type.

In Figure 1, the frequency converter set 1 comprises three synchronous type machines. The central machine 2 of the set comprises a rotor member 3 and a frame member 4. The rotor member 3 comprises a rotor shaft 5, supported on pedestal bearings 6, 7, and a conventional salient pole rotor 8 receiving D. C. excitation from a suitable source through a pair of collector rings 9 on the shaft 5.

The frame member 4 comprises an armature core 10 and winding 11 carried in a case or frame 12, which is rotatably supported on hollow trunnions 13, 14, in bearings 15, 16, respectively.

The armature windings 11 are connected to collector rings 17, which are mounted on the trunnion 13. The collector rings are connected to busbars 18 of one of the two power systems interconnected by this converter 1, by means of brushes 19, leads 20, and a switch 21.

The rotatable frame member 4 is mechanically connected to a synchronous machine 25 by means of a coupling 26 which couples the shaft 27 of the second machine 25 to the trunnion 13, which extends beyond the bearing 15.

The shaft 27 of the second machine 25, as well as the trunnions 13, 14, are hollow to receive the rotor shaft 5 which extends through the hollow shaft 27, and the trunnions 13, 14 to the bearings 6, 7. The second machine 25 is adapted for connection to busbars of the other of the two interconnected systems by means of leads 33 and a switch 34.

A third synchronous machine 28 is coupled to the rotor shaft 5 by a coupling 29. This machine is also adapted for connection to the last mentioned busbars 30 by leads 31 and a switch 32.

These two machines 25, 28 are adapted to run in relatively opposite directions of rotation. Hence, the net speed of the central machine 2 is the relative speed between its rotor member 3 and its frame member 4, and is equal to the sum of the speeds of the other two machines 25 and 28.

With this converter set 1 there are available several combinations of moderate and high speeds by which a given frequency ratio can be obtained. For example, to obtain a ratio of 60/25 cycles, the two machines 25, 28, can be adapted to run at 600 R. P. M. and 900 R. P. M. respectively in opposite directions on 60 cycles, resulting in a relative rotative speed between the rotatable members of the third machine 2 of 1500 R. P. M., which is the 25 cycle synchronous speed of a two pole machine.

A rotor which operates at 900 R. P. M. can attain peripheral speeds up to the practical design limit with a diameter of between 5 and 6 feet, which is well within practical dimensions. Hence, there is additional machine capacity available which is proportional to the increase in peripheral speed made possible by this increase in rotative speed. Furthermore, there is an additional increase in machine capacity now available from the frame member which rotates at 600 R. P. M. This additional increase in capacity amounts to 66.7%, which of course requires one extra machine to change this mechanical energy to electrical energy.

There are other combinations of speeds higher than 300 R. P. M. which can be used in the 60/25 cycle converter. For example, if 900 R. P. M. and 600 R. P. M. on the 60 cycle machines are too high, as might be the case in very large converters, speeds of one-half these values, or 450 R. P. M. and 300 R. P. M. may be used, giving a relative speed of 750 R. P. M. between rotor member 3 and frame member 4, which is a 25 cycle speed for a 4-pole synchronous machine. Or, the rotatable frame machine 2 can be adapted for 60 cycles instead of 25 cycles with a relative speed of 900 R. P. M. between rotor and frame, in which case the other two machines would operate on 25 cycles at speeds of 750 R. P. M. and 150 R. P. M. respectively.

One method of starting and accelerating this converter set employs a small-starting motor 22 coupled to the synchronous machine 28, which is connected to the rotor shaft 5. This starting motor accelerates the synchronous machine 28 up to its rated speed, bringing with it the rotor shaft 5. The synchronous machine 28 can then be synchronized to the system busbars 30. The rotatable frame machine 2, with its frame yet stationary and its rotor running at, for example, 900 R. P. M., is already up to 60% of its rated speed; therefore, it is capable of developing sufficient torque to accelerate and pull into synchronism. By closing the starting switch 24, the armature winding 11 is connected to the busbars 18 through a starting compensator 23, whereby the machine accelerates from 900 R. P. M. to 1,500 R. P. M. relative speed between rotor and frame. However, as the speed of the rotor is fixed at 900 R. P. M. by the synchronous machine 28, the frame member 4 accelerates to 600 R. P. M. in the relatively opposite direction, at which speed the other synchronous machine 25 coupled to the frame, can be synchronized. The switch 21 can then be closed and the starting switch 24 opened.

Other suitable methods for starting will be apparent to those skilled in the art.

Figure 2:
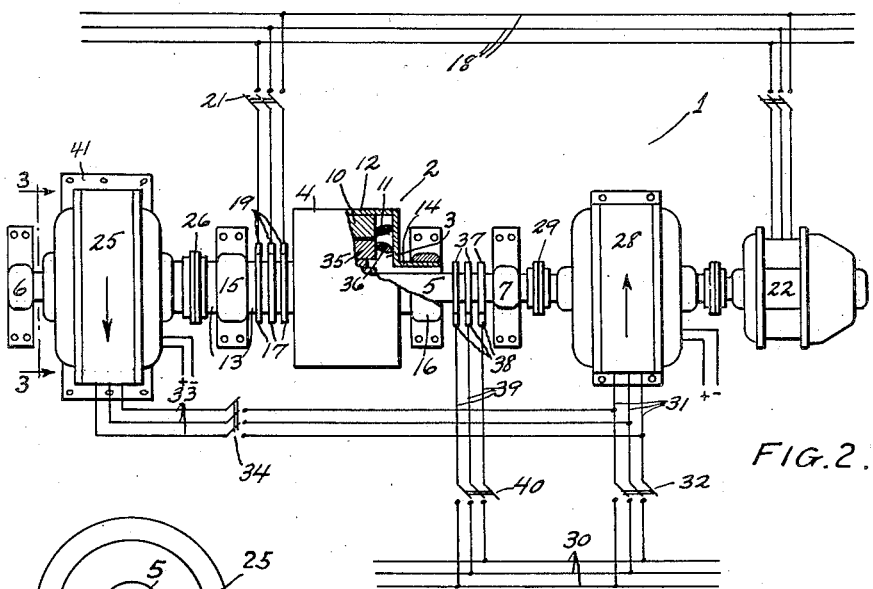
Figure 2 illustrates another embodiment in which one of the machines is of the induction type.

Referring now to Figure 2, the rotatable frame machine 2, instead of being of synchronous type, is a wound rotor type induction machine having a rotor core 35 mounted on the shaft 5, and a rotor or secondary winding 36 terminating at collector rings 37 on the rotor shaft 5. The rings 37 are connected to the system of lower frequency by means of brushes 38, leads 39, a switch 40, and the busbars 30.

In this embodiment the armature or primary winding 11 is connected to the system of higher frequency through the switch 21. The two other machines 25, 28 are connected to the system of lower frequency. Hence, part of the energy transmitted between the two systems is converted directly from 60 cycles to 25 cycles within the induction machine and the remainder is generated in the other two machines.

In this embodiment, the relation between the three machines of the converter is expressed by the following equation:

$$\frac{f_1-f_2}{p_1}=\frac{f_2}{p_2}+\frac{f_2}{p_3}$$

where the relative speed between the rotor member and frame member corresponds to a frequency which is equal to the difference between the frequencies of the two systems.

Whereas in the embodiment of Figure 1 there are several combinations of two 60 cycle synchronous speeds, the sum of which is a 25 cycle speed appreciably higher than the conventional frequency converter speed of 300 R. P. M., or vice versa, in the embodiment of Figure 2 there is only one combination of speeds which can result in a speed higher than the conventional 300 R. P. M. for a 60/25 cycle converter. This combination consists of a 4-pole, 25 cycle, 750 R. P. M. machine 28 connected to the rotor member 3, a 10-pole, 300 R. P. M., 25 cycle machine 25 connected to the frame member 4, resulting in a relative speed of 1,050 R. P. M. between the two rotatable members, the rotatable frame machine 2 being a 4-pole machine. As its armature winding is connected to the 60 cycle system, the frequency of the voltage generated in the rotor circuit at 1,050 R. P. M. is 25 cycles, which is the correct value to enable the connection of the rotor windings 36 to be made to the 25 cycle busbars 30.

In this embodiment the secondary winding and the two synchronous machines 25, 28 must necessarily be connected to the 25 cycle bus rather than to the 60 cycle bus because the induction machine must run at a speed corresponding to the difference between the two frequencies and hence has a mechanical power output which must obviously flow to the 25-cycle bus through the synchronous machines 25, 28. There is, therefore, no alternative connection of these machines to the 60 cycle bus as in the first embodiment.

Comparing this embodiment to a conventional 300 R. P. M. synchronous-induction frequency converter, there is a saving available by the use of higher peripheral speeds and also a 40% increase in capacity of the induction machine, because of the additional mechanical energy obtained from the rotating frame.

Figure 3:
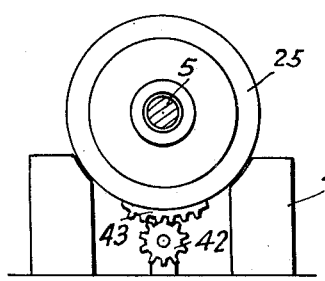
Figure 3 is an end elevation taken along a line 3—3 in Figures 1 and 2.

The method of controlling the loading of the converter of my invention is no different from the method used in connection with any conventional frequency converter, namely, by slightly shifting the stator of one of the end machines 25, angularly about its axis, in a supporting cradle 41 by rotating a pinion 42, which engages a rack 43 fixed to the stator member, as shown in Figure 3. This method of changing load on a frequency converter is well known to those skilled in the art and therefore an explanation here is not necessary.

In Figure 2 I have shown a second method of starting the converter set, which could also be employed on the first embodiment as well. In this method the leads 33 of one of the synchronous machines 25 are connected through the switch 34 to the leads 31 of the other synchronous machine 28 instead of direct to the bus 30 as in Figure 1.

With the switch 32 open, the synchronous machine 28 is accelerated by the induction starting motor 22, but if the field of the synchronous machine 28 is excited it will generate voltage at gradually increasing frequency. If the two synchronous machines 25, 28 are connected together by closing the switch 34 and the field of the second synchronous machine 25 be excited, machine 25 can be started and accelerated at the same time but in the relatively opposite direction by energy which flows to it from machine 28.

In this manner, all machines can be brought up to normal speed by the one starting motor 22, then synchronized to the system and connected thereto by the switch 32. As the two rotatable members 3, 4 are now running at their normal relative speeds, this machine 2 can also be connected to the two sets of busbars by closing the switches 21, 40.

A small angular shift of the stator of one of the synchronous machines 25, may be necessary to synchronize properly and to control the power transmitted through the converter set in a manner known to those skilled in the art.

I do not intend my invention to be limited to details disclosed herein except as set forth in the following claims.

I claim:

1. A frequency converter for interconnecting two electrical systems of different frequencies, said converter comprising a synchronous machine having a rotor member and a frame member, each of said members being mounted on bearings for independent rotation, a second synchronous machine coupled to said rotor member and a third synchronous machine coupled to said frame member, means for electrically connecting the first said machine to one of said systems, and means for electrically connecting the other two said machines to the other of said systems for operation in relatively opposite directions of rotation.

2. A frequency converter for interconnecting two electrical systems of different frequencies, said converter comprising a first machine having a winding adapted for electrical connection to one of said systems, said machine having a rotor member and a frame member, each of said members being rotatable, a pair of synchronous machines, one of said synchronous machines being coupled to each of said rotatable members respectively, each of said synchronous machines having a winding adapted for electrical connection to the other of said systems.

3. A frequency converter for interconnecting two electrical systems of different frequencies, said converter comprising a first machine having a rotor member and a frame member, each of said members being rotatably mounted on bearings, said machine having a winding adapted for connection to one of said systems to produce a fixed relative speed between said rotatable members, and a synchronous type machine coupled to each of said members respectively, said synchronous type machines being adapted to fix the absolute speeds of said members at predetermined speeds in relatively opposite directions of rotation, the sum of said speeds being equal to said fixed relative speed between said members.

4. A frequency converter for transmitting power between two electrical systems of different frequencies, said converter comprising a pair of synchronous machines connected to one of said systems for operation at predetermined normal speeds in relatively opposite directions of rotation, and a third machine having a rotor member and a frame member, each of said members being independently rotatable, one of the first said synchronous machines being coupled to each of said rotatable members respectively, the third machine being adapted for synchronizing to the other of said systems at a relative speed between said rotatable members equal to the sum of the normal speeds of the two first said machines.

5. A frequency converter for transmitting power between two electrical systems of different frequencies, said converter comprising a wound rotor induction type machine, having a primary winding adapted for connection to one of said systems and a secondary winding adapted for connection to the other of said systems, said machine comprising a frame member and a rotor member, each of said members being supported on bearings for independent rotation, and a synchronous type machine coupled to each of said rotatable members respectively, said synchronous machines each having a winding adapted for electrical connection to the other of said systems.

6. A frequency converter for interconnecting two electrical systems of different frequencies, said converter comprising a wound rotor induction type machine having a primary winding adapted for connection to the system of higher frequency and a secondary winding adapted for connection to the system of lower frequency, said machine comprising a frame member and a rotor member, each of said members being rotatably mounted in bearings, and a synchronous type machine coupled to each of said rotatable members respectively, each of said synchronous machines having a winding adapted for connection to the system of lower frequency, for operation at predetermined speeds in relatively opposite directions, whereby the relative speed between said rotor member and said frame member is a synchronous speed corresponding to a frequency equal to the difference between the frequencies of the two interconnected systems.

7. In combination, an electrical machine having a rotor member and a frame member, each of said members being mounted on bearings for independent rotation, a machine coupled to each of said members respectively, and means for starting and accelerating said members in relatively opposite directions of rotation comprising a starting motor coupled to one of said members and means for electrically inter-connecting said machines coupled to said members, whereby said starting motor accelerates one of said members through said mechanical coupling and accelerates the other of said members by power transmitted through said electrical interconnections.

8. A frequency converter comprising an electrical machine having a rotor member and a frame member, each of said members being mounted on bearings for independent rotation, a synchronous machine coupled to each of said members respectively, and means for starting and accelerating said members in relatively opposite directions of rotation, said means comprising a starting motor coupled to one of said synchronous machines and means for electrically interconnecting said synchronous machines, whereby said starting motor accelerates one of said machines through said mechanical coupling, and accelerates the other of said machines by power transmitted through said electrical interconnection.

9. A frequency converter set for interconnecting two electrical systems having a substantially constant ratio of frequencies, said converter comprising a first machine having a winding adapted for electrical connection to one of said systems, said machine having a rotor member and a frame member, each of said members being rotatable, a second machine coupled to said rotor member, and a third machine coupled to said frame member, each of the two last mentioned machines having a winding adapted for electrical connection to the other of said systems, wherein the sum of the reciprocals of the numbers of poles on the two last mentioned machines determines the reciprocal of the number of poles on the first mentioned machine.

10. A frequency converter set as claimed in claim 9 wherein the frequency of one of said systems divided by the number of poles on the first said machine is equal to the frequency of the other of said systems divided by the number of poles on said second machine plus the last mentioned frequency divided by the number of poles on said third machine.

11. A frequency converter set for interconnecting two electrical systems having a substantially constant ratio of frequencies, said converter comprising a wound rotor induction type machine having a primary winding adapted for electrical connection to one of said systems and a secondary winding adapted for connection to the other of said systems, said machine having a rotor member and a frame member, each of said members being rotatable, a second machine coupled to said rotor member, and a third machine coupled to said frame member, each of the two last mentioned machines having a winding adapted for electrical connection to the last mentioned system, wherein the frequency of the last mentioned system divided by the number of poles on said second machine plus the same frequency divided by the number of poles on said third machine are equal to the difference between the frequencies of the two systems divided by the number of poles on said induction type machine.

12. A frequency converter for interconnecting a 60 cycle power system and a 25 cycle power system, said converter comprising a 4 pole, 60 cycle wound rotor induction type machine having a rotor member and a frame member, each of said members being rotatable, a primary winding on said machine adapted for connection to said 60 cycle system and a secondary winding on said machine adapted for connection to said 25 cycle system, a 4 pole synchronous machine coupled to said rotor member and adapted for electrical connection to said 25 cycle system and for operation in one direction of rotation, and a 10 pole synchronous machine coupled to said frame member and adapted for connection to said 25 cycle system and for operation in the opposite direction of rotation.

ALLEN M. ROSSMAN.